Figure 1:
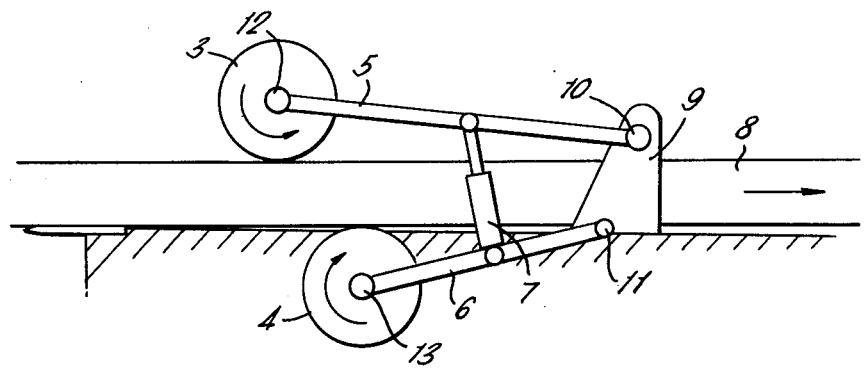

United States Patent [19]

Makela

[11] 4,094,452

[45] June 13, 1978

[54] ARRANGEMENT FOR ADJUSTING THE COMPRESSION FORCE OF DRIVE ROLLS

[75] Inventor: Markku Makela, Tampere, Finland

[73] Assignee: Rauma-Repola Oy, Finland

[21] Appl. No.: 776,481

[22] Filed: Mar. 10, 1977

[30] Foreign Application Priority Data

Mar. 10, 1976 Finland .................................. 760617

[51] Int. Cl.² ............................................ B65H 17/34
[52] U.S. Cl. ...................................... 226/34; 226/177; 226/186
[58] Field of Search ..................... 226/34, 35, 39, 176, 226/177, 186

[56] References Cited

U.S. PATENT DOCUMENTS

| | | | |
|---|---|---|---|
| 3,473,715 | 10/1969 | Shuey | 226/177 X |
| 3,565,310 | 2/1971 | Hugonin | 226/34 |
| 3,658,222 | 4/1972 | Dressel | 226/35 X |
| 3,854,614 | 12/1974 | Albrecht | 226/177 X |

Primary Examiner—Richard A. Schacher

Attorney, Agent, or Firm—Burns, Doane, Swecker & Mathis

[57] ABSTRACT

An arrangement for adjusting the compressive force of drive rolls used for advancing a tree along a feed line for lopping. Drive rolls are arranged on opposite sides of the tree trunk and driven by hydraulic motors. Each drive wheel is pivotably mounted on its own arm and a cylinder-piston is connected between the arms and is used to adjust the distance between the drive rolls and to produce a compression force between them. A hydraulic circuit is provided which includes a drive motor, a pressure reducing valve and the cylinder-piston. The tank connection of the control pressure of the pressure-reduction valve is connected to the working pressure of the hydraulic motor so that when the rolls require a low rotating force the compression pressure created by the cylinder-piston is low and when the rolls require a high rotating force the working pressure required by the hydraulic motor increases and this working pressure increases the compression forces exerted by the cylinder-piston.

7 Claims, 2 Drawing Figures

ARRANGEMENT FOR ADJUSTING THE COMPRESSION FORCE OF DRIVE ROLLS

The subject of the present invention is an arrangement for adjusting the compression force of drive rolls in the treatment of lengthy goods, such as, for example, when lopping trees, whereby the drive rolls are arranged as rotated by hydraulic motors connected in parallel in the hydraulic system operating said hydraulic motors, and the drive rolls are arranged on both sides of the feeding line and are each of them mounted at a pivotable arm of its own, a cylinder-piston device being arranged between said arms so as to adjust the distance between the drive rolls and to produce a compression force between them.

In lopping trees by means of multi-function processors, a problem has been that on the thick portion of the tree trunk the drive rolls tend to slide, whereas on the thinner portion near the top of the tree the high compression force causes splitting of the tree.

By means of the present invention, both of the above drawbacks are eliminated, and the invention is mainly characterized in that a precontrolled pressure-reduction valve in itself known is arranged into the hydraulic circuit operating the cylinder-piston device so that the tank connection of the control pressure of the pressure-reduction valve is connected to the working pressure of the hydraulic motors of the drive rolls, whereby, when the rolls require a low rotating force, the compression pressure is at the value adjusted by the spring of the pressure-reduction valve and, when the requirement of rotating force for the rolls increases, the working pressure required by the hydraulic motors also increases and this working pressure also increases the compression pressure of the cylinder-piston device depending on the requirement of drive force to be produced by the rolls.

Figure 2:
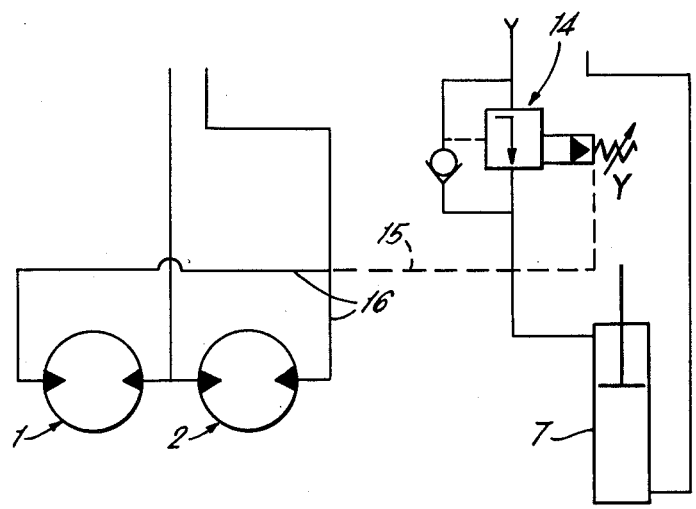

The invention comes out more closely from the following description and from the attached drawing, wherein FIG. 1 schematically shows a side view of the drive apparatus arranged onto the treatment line and FIG. 2 shows, as a hydraulic diagram, how the compression of the drive rolls is increased by means of a pressure-reduction valve precontrolled from the hydraulic circuit of the drive motors.

According to FIG. 1, the drive apparatus comprises two rolls 3 and 4 provided with surfaces of sufficient adhesive capacity and rotating around horizontal axles, the moment of rotation of said rolls required for feeding the tree 8 being obtained, e.g., from hydraulic motors 1 and 2 placed inside the rolls, as well as from two arms 5 and 6, which are connected to part 9 by means of articulated joints and between which arms 5 and 6 a cylinder-piston device 7 is mounted, which provides the rolls 3 and 4 with the compression force required by them. The arms 5 and 6 are mounted on axles 10 and 11, which are transversal to the treatment line and parallel to the axles 12 and 13 of the rolls 3 and 4.

The present invention is concerned with adjusting the compression force produced by the cylinder-piston device 7 between the rolls 3 and 4 in accordance with the requirements existing at each particular time. This is achieved by means of an adjusting system, whose hydraulic diagram is shown in FIG. 2.

The hydraulic motors 1 and 2 of the drive rolls 3 and 4 are connected in parallel, and the working pressure required by them, from the inlet pipes 16, is via connection 15 connected to the precontrolled pressure-adjusting valve 14, arranged into the hydraulic circuit of the cylinder-piston device 7 in accordance with FIG. 2, to the tank connection of the control pressure of said valve 14.

When the tree 8 requires a low drive force, the compression pressure is at the value adjusted by the spring of the pressure-reduction valve 14. When the requirement of drive force increases, the working pressure required by the drive motors 1 and 2 is also increased. As the tank connection of the control pressure of the pressure-reduction valve 14 is connected to the working pressure of the drive motors 1 and 2, the compression pressure increases depending on the requirement of drive force.

The pressure-reduction valve 14 is provided with a slide, one end of which is affected by an adjustable spring and by the precontrol pressure and the other end of which is affected by the pressure reduced by the valve itself. The spring and the precontrol pressure attempt to keep the valve 14 open, and the pressure affecting the other end of the slide attempts to close the valve. By the spring, the lower limit of the output pressure of the pressure-reduction valve, i.e. in the present case, the lower limit of the pressure coming through the valve to the cylinder-piston device 7, can be preset at any certain value lower than the inlet pressure. When the control pressure increases, depending on that, the output pressure also increases.

What I claim is:

1. A system for adjusting the compression force exerted upon a lengthy article as it is driven along a feed line comprising:
   a plurality of drive rolls disposed about the periphery of said article and in contact with the surface thereof;
   an arm means associated with each drive roll for pivotably mounting each drive roll to a support structure;
   drive means for said drive rolls for advancing said lengthy article along said feed line;
   means connected between said arm means and operatively connected to said drive means and adapted to adjust the compression force between said rolls in proportion to the force exerted by said drive means to advance said lengthy article along said feed line.

2. The system according to claim 1 wherein said drive means includes at least one hydraulic motor; and,
   said connecting means includes,
   an hydraulic cylinder-piston; and,
   valve means for controlling the pressure in said cylinder-piston in response to the working pressure of said hydraulic motors.

3. The system according to claim 2 wherein said drive means includes an hydraulic drive motor for each drive roll connected together in parallel.

4. The system according to claim 2 wherein said valve means includes a pressure reduction valve having:
   a first pilot pressure urging said valve toward the closed position;
   an adjustable spring means urging said valve toward the open position; and,
   a second pilot pressure responsive to the working pressure of said hydraulic motors urging said valve toward the open position;
   whereby when said working pressure is high said second pilot pressure is high and opens said valve to increase the pressure in said cylinder-piston and said drive rolls will exert a high compressive force on said article and when said working pressure is low said second pilot pressure is low and said valve closes under the influence of said first pilot pressure to decrease the pressure in said cylinder-piston and said drive rolls will exert a low compressive force on said article.

5. The system according to claim 2 wherein said valve means includes a precontrolled pressure-reduction valve having the tank connection of its control pressure connected to the working pressure of said hydraulic motors.

6. The system according to claim 4 wherein said first pilot pressure responds to the reduced pressure of said pressure reducing valve.

7. The system according to claim 4 wherein said spring means is adjusted to provide a minimum outlet pressure for said valve to provide a minimum pressure in said cylinder-piston and a minimum compressive force on said article.

* * * * *